Feb. 3, 1931.                W. J. VILLAVASO                1,791,333
                             FILTERING APPARATUS
                         Filed Jan. 27, 1930        3 Sheets-Sheet 3
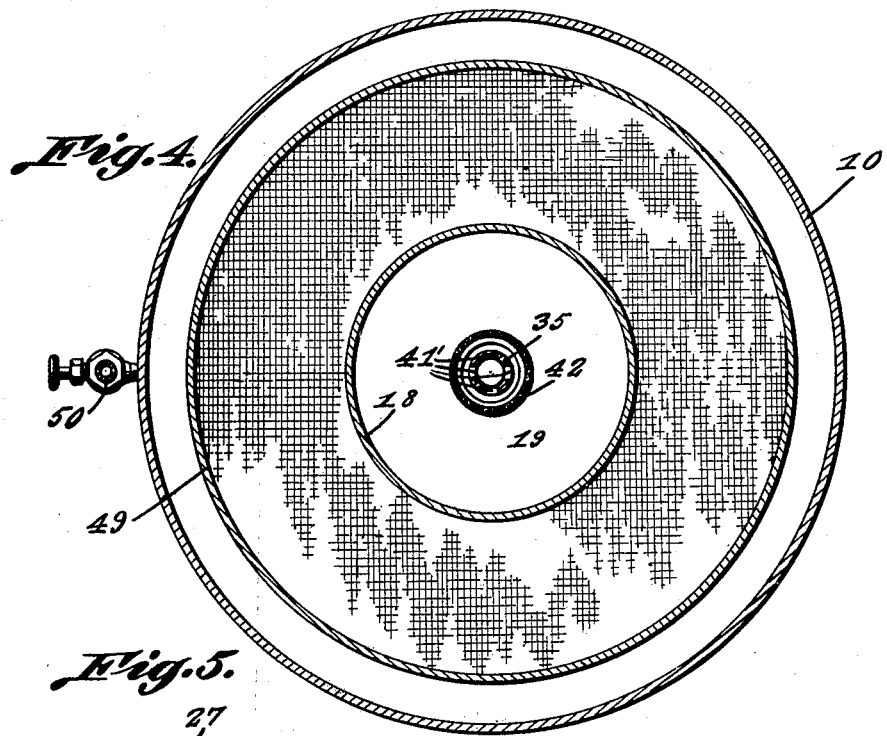
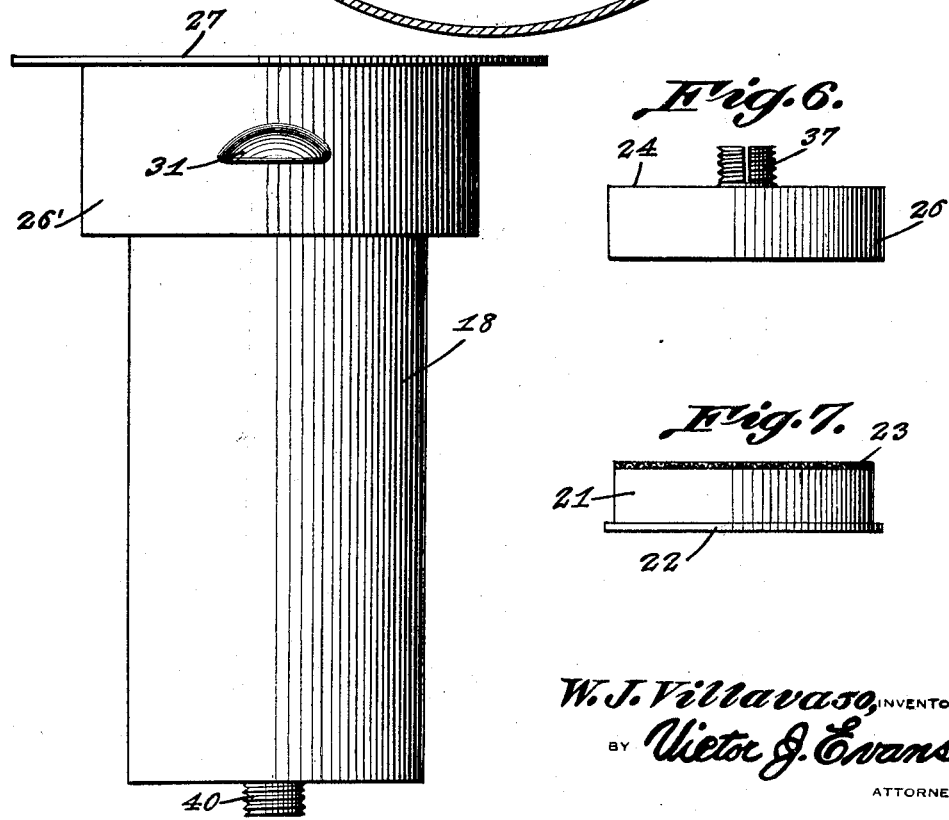
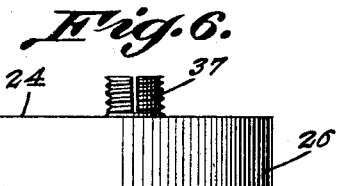
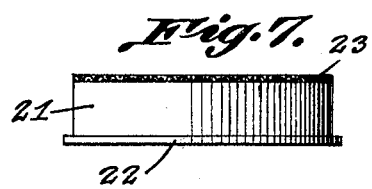

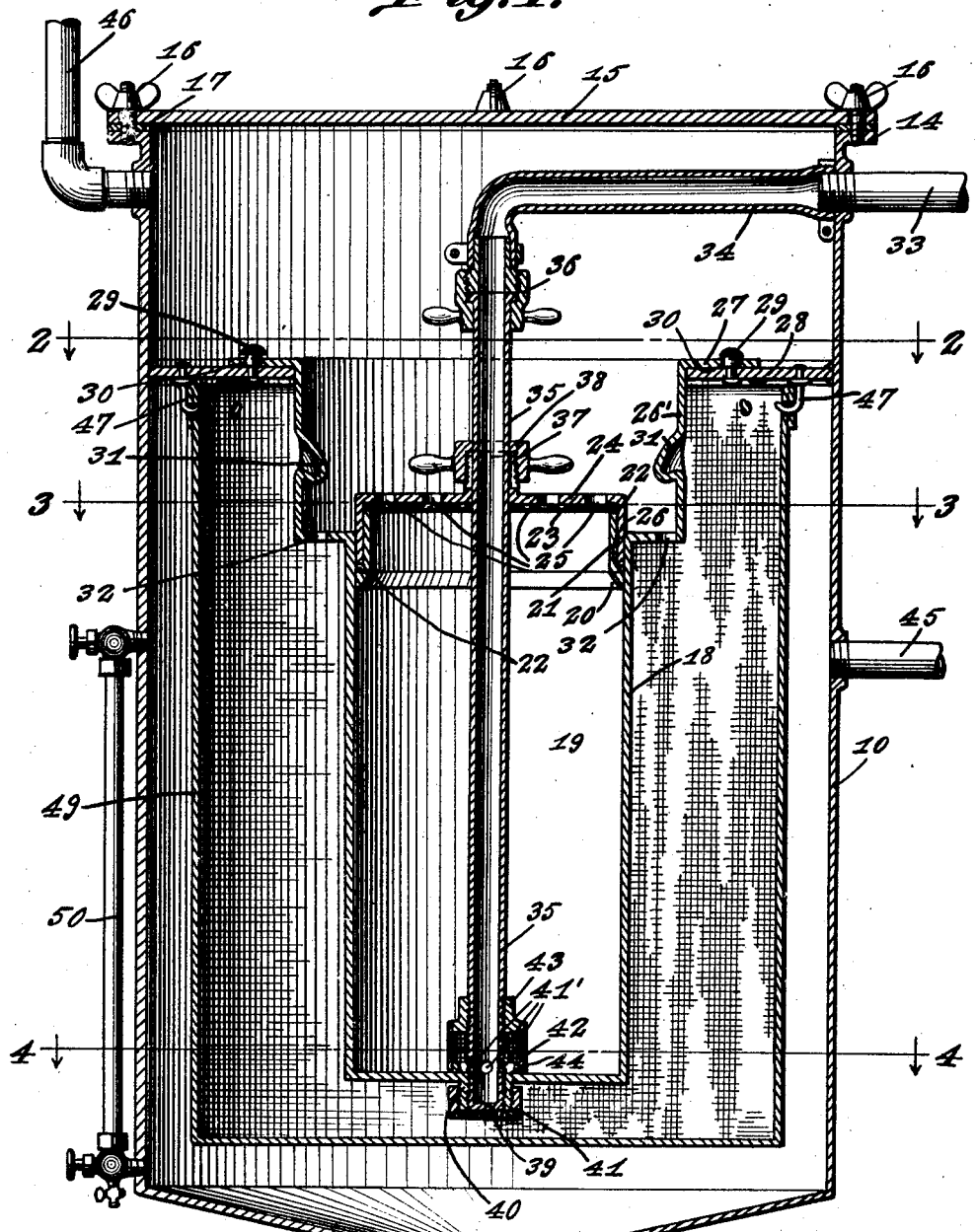

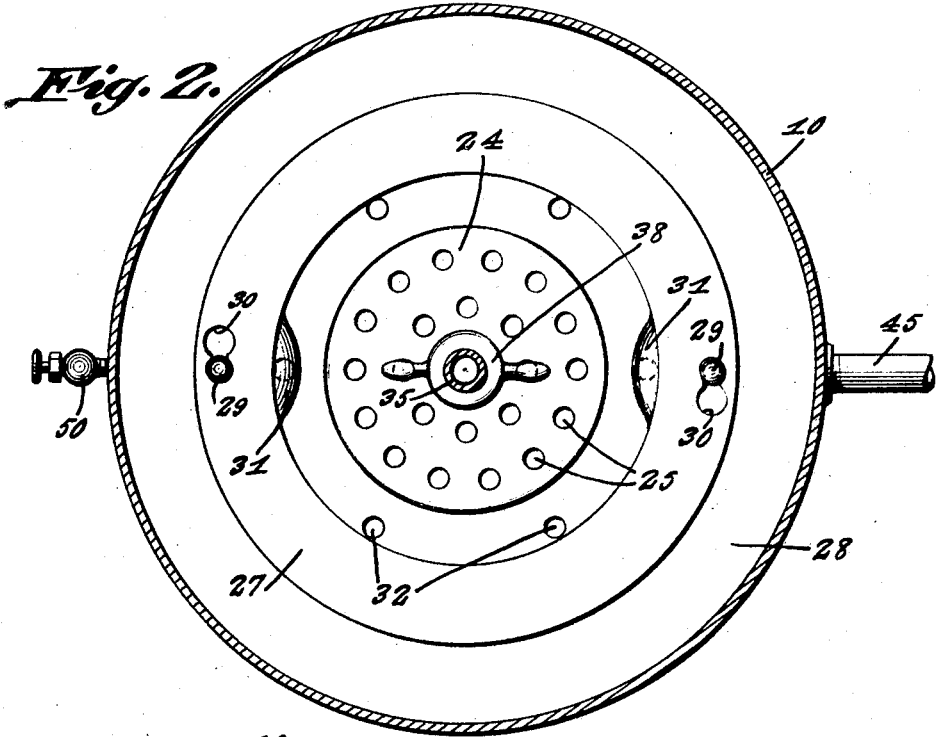
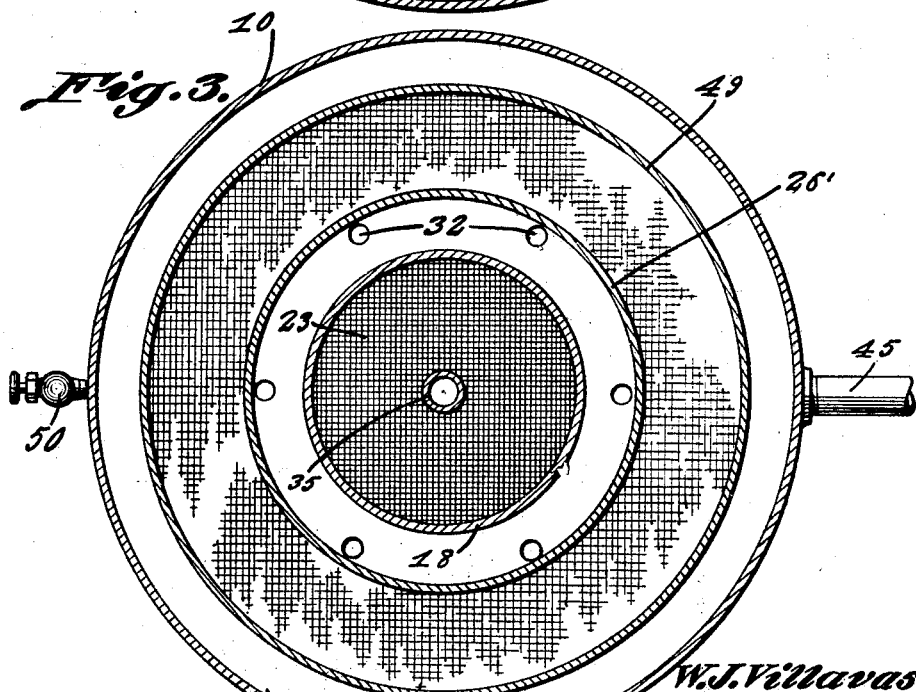

Patented Feb. 3, 1931

1,791,333

UNITED STATES PATENT OFFICE

WILLIAM J. VILLAVASO, OF NEW ORLEANS, LOUISIANA

FILTERING APPARATUS

Application filed January 27, 1930. Serial No. 423,761.

This invention relates to filters especially designed for filtering and clarifying naphtha, high-test gasoline, Stoddard's solvent and other fluids used as cleaning agents for dry cleaning clothes and other fabrics.

Another object of the invention is the provision of a filter for the above purpose which will eliminate the water bath commonly employed, means being provided for removing water from the cleaning agent, as well as for the removal of all other foreign matter during the filtering operation.

Another object of the invention is the provision of a filter which will operate under pressure to filter a cleaning agent in a relatively short time, rendering it unnecessary for an establishment to carry a large quantity of cleaning agent or solvent, which together with the use of a filtering agent of low cost provides for an economy of operation.

Another object of the invention is the provision of a filter which, in addition to the above stated and other advantageous features, may be connected in any of the dry cleaning systems without disturbing their line-up or arrangement.

With the above and other objects in view, the invention further includes the following novel features and details of construction, to be hereinafter more fully described, illustrated in the accompanying drawings and pointed out in the appended claims.

In the drawings:—

Figure 1 is a vertical sectional view through a filter constructed in accordance with the invention.

Figures 2, 3 and 4 are sectional views taken respectively on the lines 2—2, 3—3 and 4—4 of Figure 1.

Figure 5 is a detail elevation of the filtering chamber.

Figure 6 is an elevation of the cap.

Figure 7 is a like view of the screen carrying annulus.

Referring to the drawings in detail wherein like characters of reference denote corresponding parts, the reference character 10 indicates the housing of the filter which is provided with an inclined bottom 11 and a drain 12, the latter being controlled by a valve or cock 13.

The upper end of the housing 10 is flanged as shown at 14 and is closed by a plate 15 which is removably secured in place by clamping nuts 16, while a suitable gasket 17 is interposed between the flange 14 and the plate 15.

Located within the housing 10 is a container 18 which provides a filtering chamber 19, the latter being designed to contain a filtering substance or agent such as fuller's earth. The upper end of the chamber 19 is provided with an annular flange 20 and removably seated upon this flange is an annulus 21. This annulus is preferably formed of copper and is provided with a flange 22 which rests upon the flange 20 and spaces the annulus from the adjacent wall of the filtering chamber. The annulus 21 carries a screen 23 which is clamped upon the upper edge of the annulus by a cap 24. This cap is provided with openings 25 and carries a flange 26 which extends over the annulus 21 and is positioned between this annulus and the adjacent wall of the container 18.

The container 18 has extending upwardly therefrom an annular wall 26' of relatively large diameter, and extending from this wall is a horizontally disposed flange 27 which rests upon a flange 28 fast with and extending inwardly from the housing 10. The flange 28 carries headed studs 29 which pass through key-hole slots 30 provided in the flange 27, so that the flange 27 and consequently the container 18 may be detachably secured to the flange 28 of the housing. The wall 26 is provided with inwardly extending hand grips 31 for convenience of removing the container 18.

Openings 32 are arranged around the lower end of the wall 26 so as to provide communication between the filtering chamber 19 and the interior of the housing through these openings and through the openings 25 in the cap 24.

The fluid to be filtered may be fed under pressure through a pipe 33 which provides an inlet, and the inner end of this pipe has secured thereto one end of a pipe 34. The opposite end of the pipe 34 is detachably secured to the upper end of a pipe 35 by means of a coupling 36.

The pipe 35 extends downwardly through the cap 24 and for this purpose, the cap is provided with an opening which is surrounded by a split sleeve 37. A clamping sleeve 38 is threaded upon the sleeve 37 and is provided with suitable handles whereby the clamping sleeve may be manipulated to clamp the sleeve 37 upon the pipe 35.

The lower end of the pipe 35 is closed as indicated at 39 and this closed end is threadedly engaged with a nipple 40 which extends downward from the lower end of the container 18. A screen cap 41 is secured to this nipple over the closed end of the pipe 35. This pipe is also provided with openings 41' so as to establish communication between this pipe and the filtering chamber 19. A screen 42 surrounds the pipe 35 and is spaced from the openings. This screen is carried by a collar 43 and engages over an annular flange 44 provided at the bottom of the filtering chamber.

The housing is provided with an outlet 45 for the discharge of the filtered fluid, while a vent 46 provides for the escape of fumes.

Detachably secured to hooks 47 which depend from the flange 48 is a moisture bag 49 of suitable material. As shown in the drawings this bag encloses the filter chamber or container 18 and the cleaning agent from the chamber 19 must pass through this bag to reach the outlet 45.

A gauge 50 is carried by and is in communication with the interior of the housing 10.

The cleaning agent to be filtered is supplied to the filter chamber through the pipe 30 and enters this chamber through the screen 42 so as to eliminate some of the foreign matter. The cleaning agent is then forced upward through the fuller's earth or other granular substance within the chamber 19 and passes through the openings 25 and 32 and through the bag 49 until it has reached a sufficient height to pass outward through the pipe 45.

When the pipe 35 is removed for any purpose, the screen cap 41 prevents the foreign matter from passing from the chamber 18 into the water bag. All moisture is thus prevented from passing into the housing and out through the pipe 45.

The invention is susceptible of various changes in its form, proportions and minor details of construction and the right is herein reserved to make such changes as properly fall within the scope of the appended claims.

Having described the invention what is claimed is:—

1. A filter including a housing having an inlet and an outlet, an annular flange in the housing, a filter chamber in the housing and positioned below the flange, an enlarged portion on said chamber and detachably secured to the flange and having openings, a filter bag supported by the flange and encasing the chamber, a perforated cap closing the upper end of the chamber and having openings, a screen in said cap for closing said last named openings, and a pipe detachably secured to the inlet and the chamber and terminating adjacent the bottom wall of said chamber to deliver fluid from the inlet to the lower part of the chamber.

2. A filter including a housing having an inlet and an outlet, an annular flange in the housing, a filter chamber in the housing and positioned below the flange and having a centrally arranged open seat in the bottom wall thereof, a closure for said seat and removable therefrom, a filter bag supported by the flange and disposed about the chamber, a perforated cap closing the upper end of the chamber, an enlarged portion formed on the upper end of the chamber and detachably secured to the flange and having perforations therein, a pipe having the lower end received in the seat and extending through the cap and having perforations arranged above the bottom wall of the chamber, means detachably connecting the pipe to the cap, and means connecting the pipe to the inlet.

3. A filter including a housing having an inlet and an outlet, an annular flange in the housing, a filter bag supported by said flange, a chamber arranged within the bag and having its upper end enlarged and detachably secured to the flange and provided with perforations, a seat formed in the bottom wall of the chamber, a perforated cap closing the upper end of the chamber within the enlarged portion, a pipe secured in the seat and extending through the cap and having perforations arranged adjacent the seat and bottom wall of the chamber, means detachably connecting the pipe to the cap, and means detachably connecting the pipe to the inlet.

In testimony whereof I affix my signature.

WILLIAM J. VILLAVASO.